US006957512B2

(12) United States Patent
Bakula et al.

(10) Patent No.: US 6,957,512 B2

(45) Date of Patent: Oct. 25, 2005

(54) METHOD FOR THE PROPOGATION OF AND AEROPONIC GROWING OF PLANTS AND VESSELS THEREFOR

(75) Inventors: Roxanne E. Bakula, Eau Claire, WI (US); R. Alexander Masson, Lake Quivira, KS (US); Charles F. Walton, Hudson, OH (US)

(73) Assignee: Smithers-Oasis Company, Cuyahoga Falls, OH (US)

( * ) Notice: Subject to any disclaimer, the term of this patent is extended or adjusted under 35 U.S.C. 154(b) by 0 days.

(21) Appl. No.: 10/720,910

(22) Filed: Nov. 24, 2003

(65) Prior Publication Data

US 2005/0108938 A1 May 26, 2005

(51) Int. Cl.[7] ........................ A01G 31/00; A01G 25/00

(52) U.S. Cl. ........................... 47/62 A; 47/64; 47/66.7; 47/80; 47/41.12

(58) Field of Search .............................. 47/62 A, 59 R, 47/64, 80, 65.7, 66.7, 79, 41.1, 41.11, 41.12, 47/41.13, 41.14, 41.15

(56) References Cited

U.S. PATENT DOCUMENTS 1,213,331 A * 1/1917 Burleigh ........................ 47/79

(Continued)

FOREIGN PATENT DOCUMENTS

GB 2233201 A * 9/1991 .......... A01G 27/00

(Continued)

*Primary Examiner*—Peter M. Poon
*Assistant Examiner*—Andrea M. Valenti

(74) *Attorney, Agent, or Firm*—Renner, Kenner, Greive, Bobak, Taylor & Weber

(57) ABSTRACT

A method for the propagation of and aeroponic growing of plants comprises transplanting a living plant into a vessel of polymer foam having at least one cavity distal to the plant; applying water to the foam sufficient to saturate the foam, whereby roots of the plant extend into and grow within the cavity. A vessel (10, 35, 65) for the propagation of and aeroponic growing of plants comprises a foam core (15, 46, 66), defining an upper surface (12, 38, 68), a base (11, 39, 69) and a sidewall (18, 40, 70); a waterproof outer coating (14, 51, 80) at least partially covering the foam core; at least one first cavity (20, 45, 75) in the core, proximal to the base; at least one second cavity (45, 75) in the upper surface; a first passageway (23, 48, 76) extending through the foam core communicating between the first and second cavities; an external flange (41, 73) proximal to the upper surface; a peripheral trough (42, 72) between the upper surface and the external flange; at least one bore (49, 79) passing through the foam core, providing a communication between the trough and the first cavity whereby the addition of water to the trough will fill the first cavity at least partially and wet the foam core. In combination, a growing plant (13) and a vessel (10, 35, 65) for the propagation of and aeroponic growing thereof comprises a foam core, (15, 46, 66), defining an upper surface (12, 38, 68), a base (11, 39, 69) and a sidewall (18, 40, 70); a waterproof outer coating (14, 51, 80) at least partially covering the foam core; at least one first cavity (20, 45, 75) in the core, proximal to the base; a first passageway (23, 48, 76) extending through the foam core communicating between the upper surface and the first cavity; whereby the addition of water to the vessel will fill the first cavity at least partially and wet the foam core, propagating the growth of the plant, including the extension of the roots of the plant into the passageway and the first cavity.

12 Claims, 8 Drawing Sheets

U.S. PATENT DOCUMENTS

| | | | | | |
|---|---|---|---|---|---|
| 3,137,096 | A | * | 6/1964 | Hopkins | 47/79 |
| 4,034,507 | A | * | 7/1977 | Dedolph | 47/65.6 |
| 4,077,511 | A | * | 3/1978 | Mosijowsky | 206/0.5 |
| 4,355,484 | A | * | 10/1982 | Mandish | 47/63 |
| 4,420,903 | A | * | 12/1983 | Ritter et al. | 47/81 |
| 5,469,654 | A | * | 11/1995 | Thompson | 47/41.12 |
| 5,572,826 | A | * | 11/1996 | Weder | 47/41.12 |
| 5,588,253 | A | | 12/1996 | Boodley et al. | |
| 5,927,002 | A | * | 7/1999 | Walton et al. | 47/41.12 |
| 6,185,863 | B1 | * | 2/2001 | Tabbert | 47/41.12 |
| 2002/0195366 | A1 | * | 12/2002 | Castleberry | 206/423 |
| 2003/0084608 | A1 | * | 5/2003 | Garcia et al. | 47/41.12 |

FOREIGN PATENT DOCUMENTS

| | | | | | |
|---|---|---|---|---|---|
| JP | 2693092 | A1 | * | 1/1994 | A47G 7/06 |

* cited by examiner

METHOD FOR THE PROPOGATION OF AND AEROPONIC GROWING OF PLANTS AND VESSELS THEREFOR

TECHNICAL FIELD

This invention relates to vessels, e.g. pots, for the aeroponic propagation and production of plants. A method is provided whereby plants can be grown in unique vessels comprising foam, using no soil or, soilless organic mixes or transplanted plants with soil or soilless mix root balls. The vessel is designed to promote the growth and development of roots in the soil or a soilless mix, foam and moist air.

BACKGROUND OF THE INVENTION

Plants and flowers are grown today in greenhouses in variable size pots which contain soil or soilless organic mixes. Typically, the plant is started and allowed to grow to a specific size for sale to an appropriate outlet e.g. florist, nursery, grocery store, gift shop or the like for purchase by a consumer for personal use in a home or business or, to be given as a gift. Care for the plant requires the correct environment of light, temperature and water, combined with care, whereupon the plant continues to grow for a certain period or life. With proper care, the plant thrives and may be transplanted; with improper care, it withers and dies.

One of the problems with soil as the growing media is that it is difficult to provide and maintain the correct moisture content. Too much water will cause the roots to rot while too little water will cause the roots and plant to dry out and die. Another problem with soil is that it may contain pathogens such as bacteria, fungus as well as insects, all of which deleteriously affect the plants, its roots, or both.

As a substitute for soil, agriculturists have employed hydroponics, using water in lieu of soil, aeroponics, which uses air and, aerohydroponics, which uses combinations of air and water.

Plant vessels are known in a variety of materials including earthenware, glass, plastic, wood and like materials which provide a housing for the growing media and, generally contain the water that is directed onto the plant or soil.

In addition to the growing of plants in vessels for purchase and enjoyment of consumers, an industry has developed around the arrangement of art flowers and plants, which are not intended for long term growth, but rather, short term ornamental decoration and enjoyment. These products also employ a vessel of the foregoing types, such as vases and floral arrangement containers which are provided with a hydrophilic foam material. Such foams are usually polymeric and are open-celled, allowing them to take up, i.e., absorb, large quantities of water from which the stems of cut plants and flowers can draw moisture.

Generally, the foam is cut from a block by a florist and placed in the vessel which is supportive and decorative. One unique product is described in U.S. Pat. No. 6,185,863 B1, owned by the Assignee of record. The vessel there described comprises a foam base of material cut, sculpted or molded into the desired shape, and then partially covered with a waterproof coating to provide an outer shell. Additionally, the vessel is provided with an internal passageway and reservoir to contain water for short term preservation of cut flowers, plants, branches and the like, generally arranged to provide a pleasing ornamental appearance.

These products offer improvements over mere water reservoirs which spill, if tipped or overfilled. While the art has thus provided vessels for the growth of plants in soil and the arrangement of cut flowers in foam materials, it has not heretofore, provided a vessel comprising polymer foam in which plants can be grown.

SUMMARY OF INVENTION

It is therefore, an aspect of the present invention to provide a method for growing plants aeroponically.

It is another aspect of the present invention to provide a method for growing plants in vessels containing polymer foam.

It is yet another aspect of the present invention to provide a vessel for growing plants aeroponically.

It is still another aspect to provide a vessel for growing plants in polymer foam.

It is yet another aspect to provide a vessel for growing plants in polymer foam, allowing for the indirect watering of the plant via the wicking action of the foam.

At least one or more of the foregoing aspects, together with the advantages thereof over the known art relating to the growing of plants, which shall become apparent from the specification which follows, are accomplished by the invention as hereinafter described and claimed In general the present invention provides a method for the propagation of and aeroponic growing of plants comprising transplanting a living plant into a vessel of polymer foam having at least one cavity distal to the plant; applying water to the foam sufficient to saturate the foam, whereby roots of the plant extend into and grow within the cavity.

The present invention also includes a vessel for the propagation of and aeroponic growing of plants comprising a foam core, defining an upper surface, a base and a sidewall; a waterproof outer coating at least partially covering the foam core; at least one first cavity in the core, proximal to the base; at least one second cavity in the upper surface; a first passageway extending through the foam core communicating between the first and second cavities; an external flange proximal to the upper surface; a peripheral trough between the upper surface and the external flange; at least one bore passing through the foam core, providing a communication between the trough and the first cavity whereby the addition of water to the trough will fill the first cavity at least partially and wet the foam core.

The present invention also provides in combination, a growing plant and a vessel for the propagation of and aeroponic growing thereof comprising a foam core, defining an upper surface, a base and a sidewall; a waterproof outer coating at least partially covering the foam core; at least one first cavity in the core, proximal to the base; a first passageway extending through the foam core communicating between the upper surface and the first cavity; whereby the addition of water to the vessel will fill the first cavity at least partially and wet the foam core, propagating the growth of the plant, including the extension of the roots of the plant into the passageway and the first cavity.

PREFERRED EMBODIMENT FOR CARRYING OUT THE INVENTION

Figure 1:
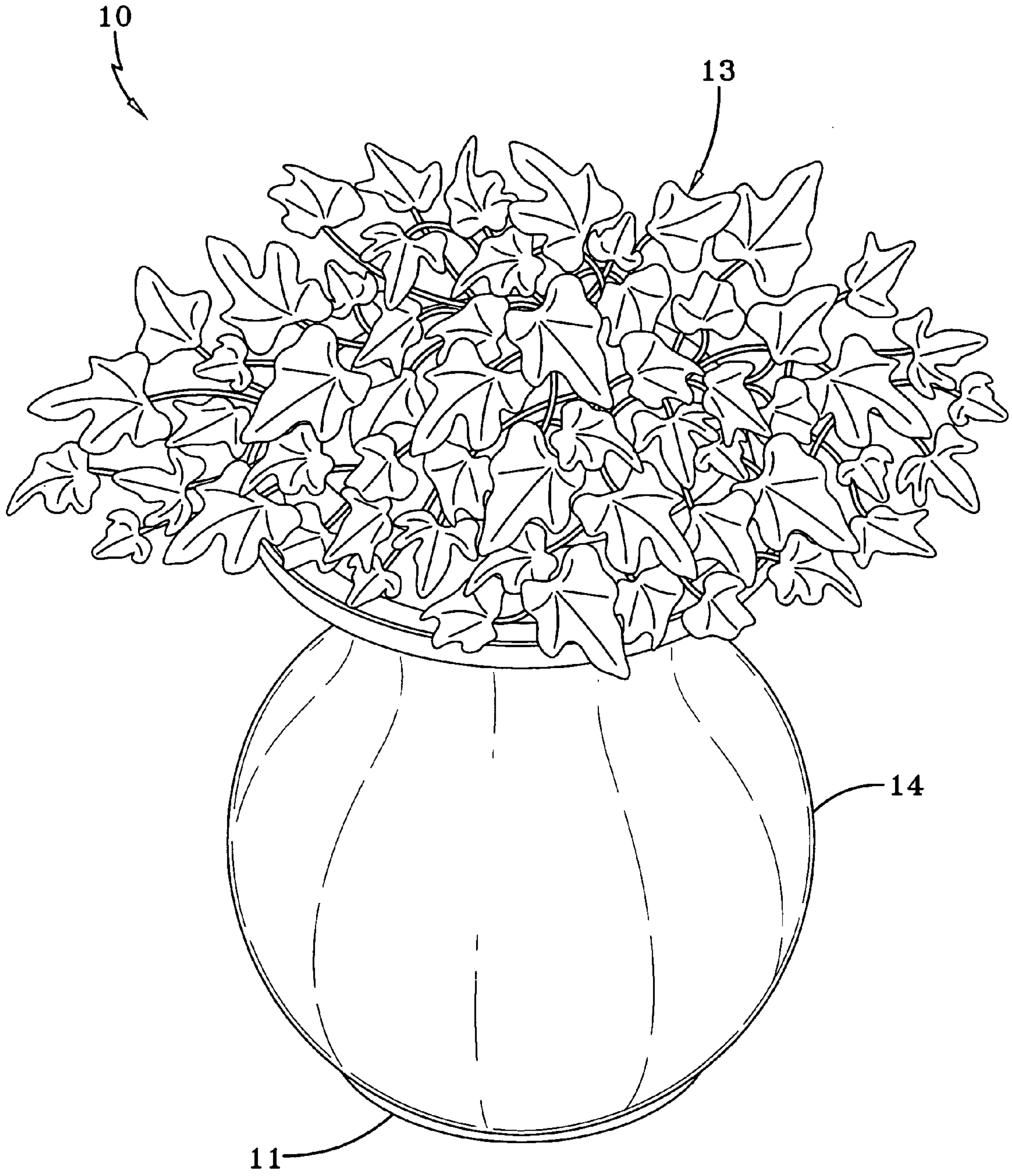
FIG. 1 is a perspective view of a vessel containing a plant growing aeroponically.
Figure 2:
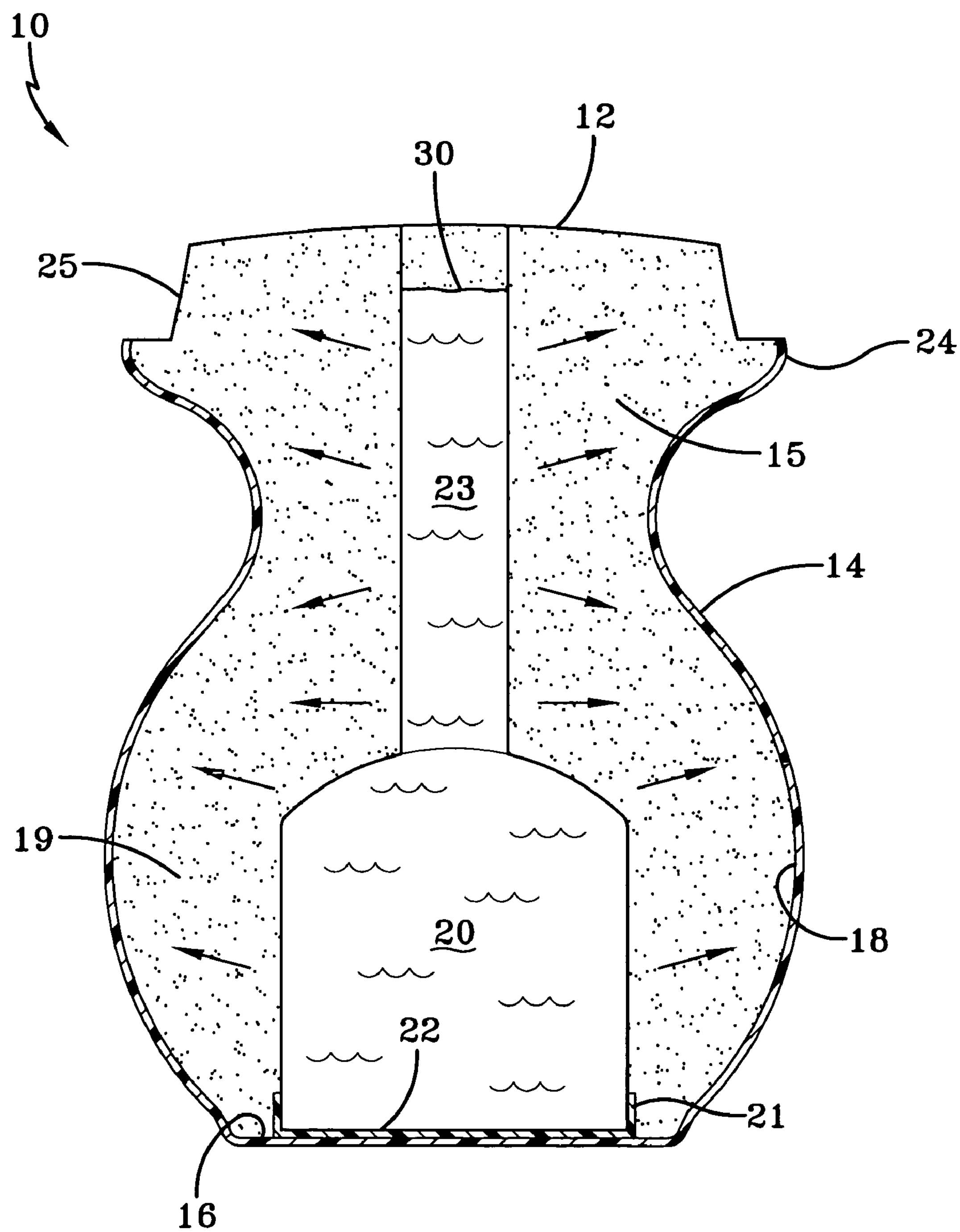
FIG. 2 is a cross-sectional view of the vessel depicted in FIG. 1, depicting the foam center and reservoirs for water and air.

One representative vessel for growing plants and flowers according to the present invention is designated generally by the numeral 10 in FIG. 1. The vessel 10 is in the shape of globular vase, having a closed base or bottom 11, and an open top 12, into which a plant, indicated by the numeral 13, is located. The exterior surface 14 of the vessel 10 provides a generally smooth, waterproof coating. As best depicted in FIG. 2, the vessel 10 comprises a foam core 15, to which the coating 14 is adhered.

The foam core 15, is in lieu of soil and is a polymeric material, which preferably has an open cell structure making it hydrophilic. One such floral foam is sold under the Oasis® trademark by the Smithers-Oasis Company, the assignee of the subject invention. Such foams are phenol-formaldehyde compositions, although the use of other polymer foams is not precluded, so long as the particular foam is hydrophilic and not injurious to the growth of plant roots.

The foam is cut, sculpted or molded into the desired shape of vessel, several of which are depicted byway of example in this specification. The core 15, provides an upper or top surface, 12, a base or bottom 16 and a continuous sidewall 18. The sidewall 18 curves radially inwardly at the upper one-third of the vessel and then curves radially outwardly, providing a wide body 19, of the vessel, before again curving radially inwardly to join the base. A reservoir 20, is cut or molded from the base 16 and extends approximately one-quarter to one-half the length of the core 15 within the body 19 and provides a diameter or width equal to about one-fourth to about one-half the width of the core, or greater. Both parameters are a function of the vessel size and geometry, as well as the habits of the plant, in terms of need for water uptake. Additionally, the foam core can also be influential, as its cellular structure will determine the capillarity of the foam and in turn, the height to which water can rise.

Although the reservoir depicted is cylindrical, it is not limited to such geometry. Similarly, although one reservoir is shown, the invention is not limited thereto. In order to seal the reservoir 20, a plastic cap 21 or other suitable material, for instance, metal, is pressed into the core 15 to seal the base 22 of reservoir 20.

A passageway 23 is bored into the core 15 from the top surface 12 and into the reservoir 20. The core 15 is eventually covered with a coating 14 which is water proof and which forms a hard shell, helping to define the shape of the vessel. As depicted in FIG. 2, the shell encompasses the base 16 and sidewall 18 and terminates in a peripheral flange 24, above which the neck 25 of the foam core may 15 extends, terminating in the top surface 12. The shell not only maintains water in the core, to minimize evaporation, but also adds sufficient rigidity to the vessel to allow it be moved and carried without damage to the core. Materials that can be used to form the shell include epoxies, polyurethanes, phenolic resins and the like. They can be applied by dipping or spraying, with suitable equipment.

A vessel of the type having a foam core and an external coating or shell is described in our U.S. Pat. No. 6,185,863 B1, the subject matter of which is incorporated herein by reference. The vessel set forth in the foregoing patent has heretofore been used only to hold cut flowers, branches and the like. It has not been used to receive a growing plant.

Figure 3:
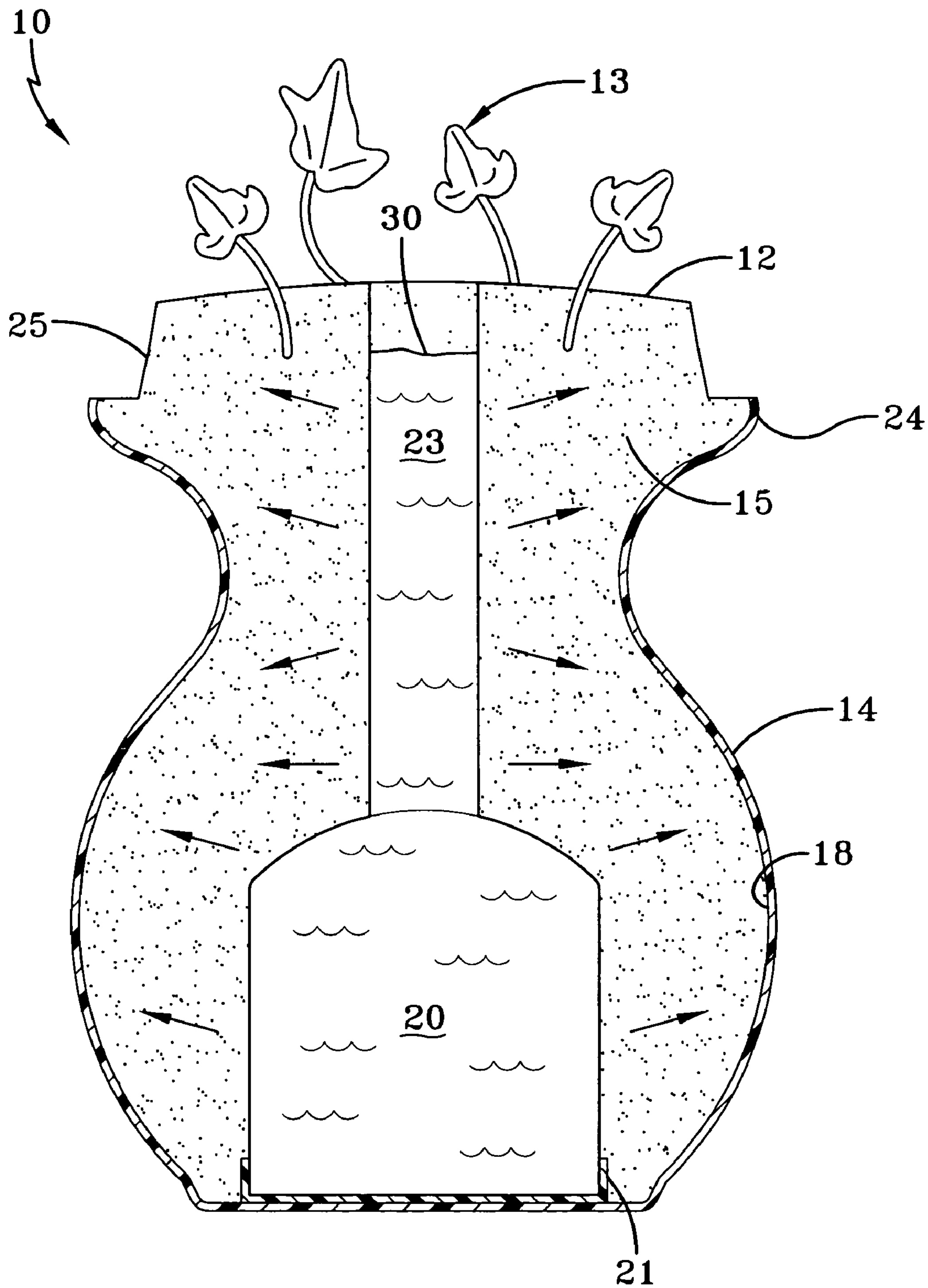
FIG. 3 is a cross-sectional view similar to FIG. 2, depicting a plant having been planted in the vessel.
Figure 4:
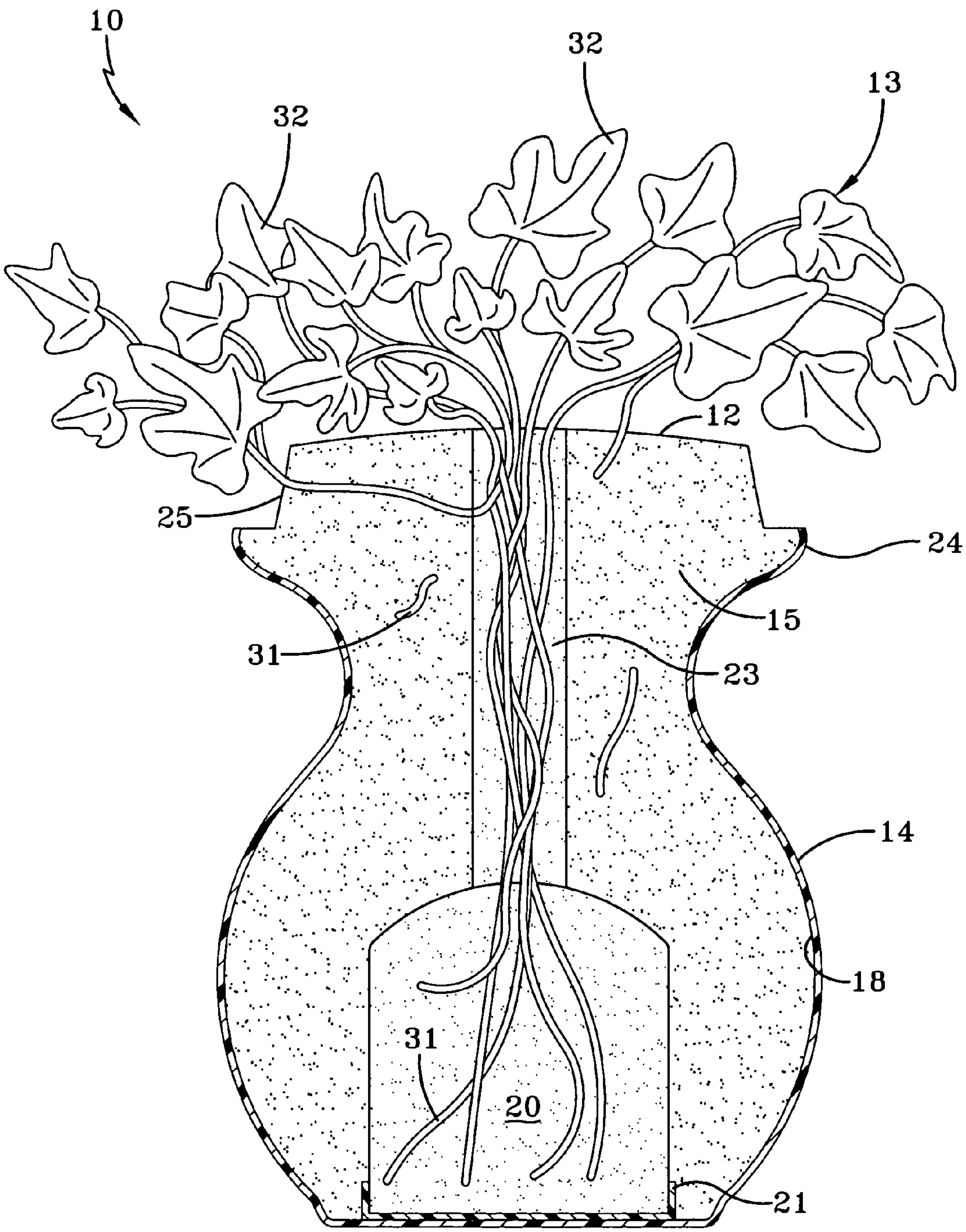
FIG. 4 is a cross-sectional view similar to FIG. 3, depicting a plant growing in the foam and root development in the reservoirs.

With reference next to FIGS. 3 and 4, the method of the present invention will be explained. The plant cuttings 13 are inserted into the foam 15. At the time of transplanting the reservoir 20 was filled with water through the passageway 23. A water level is shown at 30, near the top of the passageway 23, with the reservoir 20 filled, although the method is operable with the reservoir being at least partially filled.

Next, during propagation roots initiate in the foam and grow into the passageway 23 and into the reservoir 20. The plant will take water from the foam 15, which is replenished by the water contained in the reservoir as well as by water newly added to the foam 15. The water is translocated into the plant through the roots 31. As the reservoir 20 and passageway 23 are emptied, a moist air remains which encourages and promotes the aeroponic growth of the roots 31, as depicted in FIG. 4.

When several experimental vessels 10 were sectioned over time, it was unexpectedly found that the roots 31 had proliferated in the passageway 23 and reservoir 20, while a much less dense concentration of roots was found in the foam core 15, as shown in FIG. 4. Comparative testing with identical plants in vessels having similar dimensions to the vessel 10, but which contained soil, revealed significantly lesser growth of the vegetation 32 as well as the roots 31 over the same period of time and, under the same growing conditions.

Figure 5:
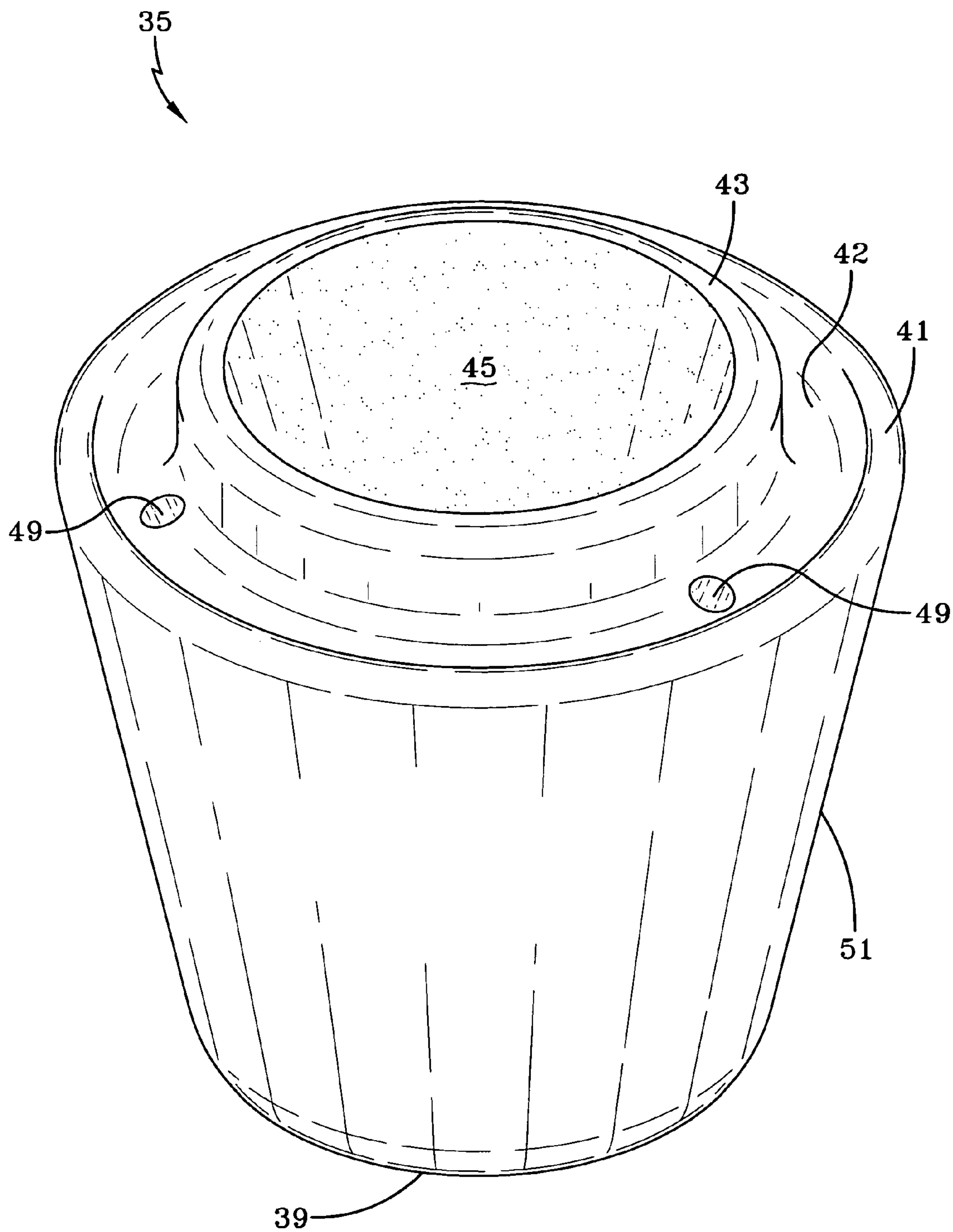
FIG. 5 is a perspective view of another vessel for growing plants aeroponically.
Figure 6:
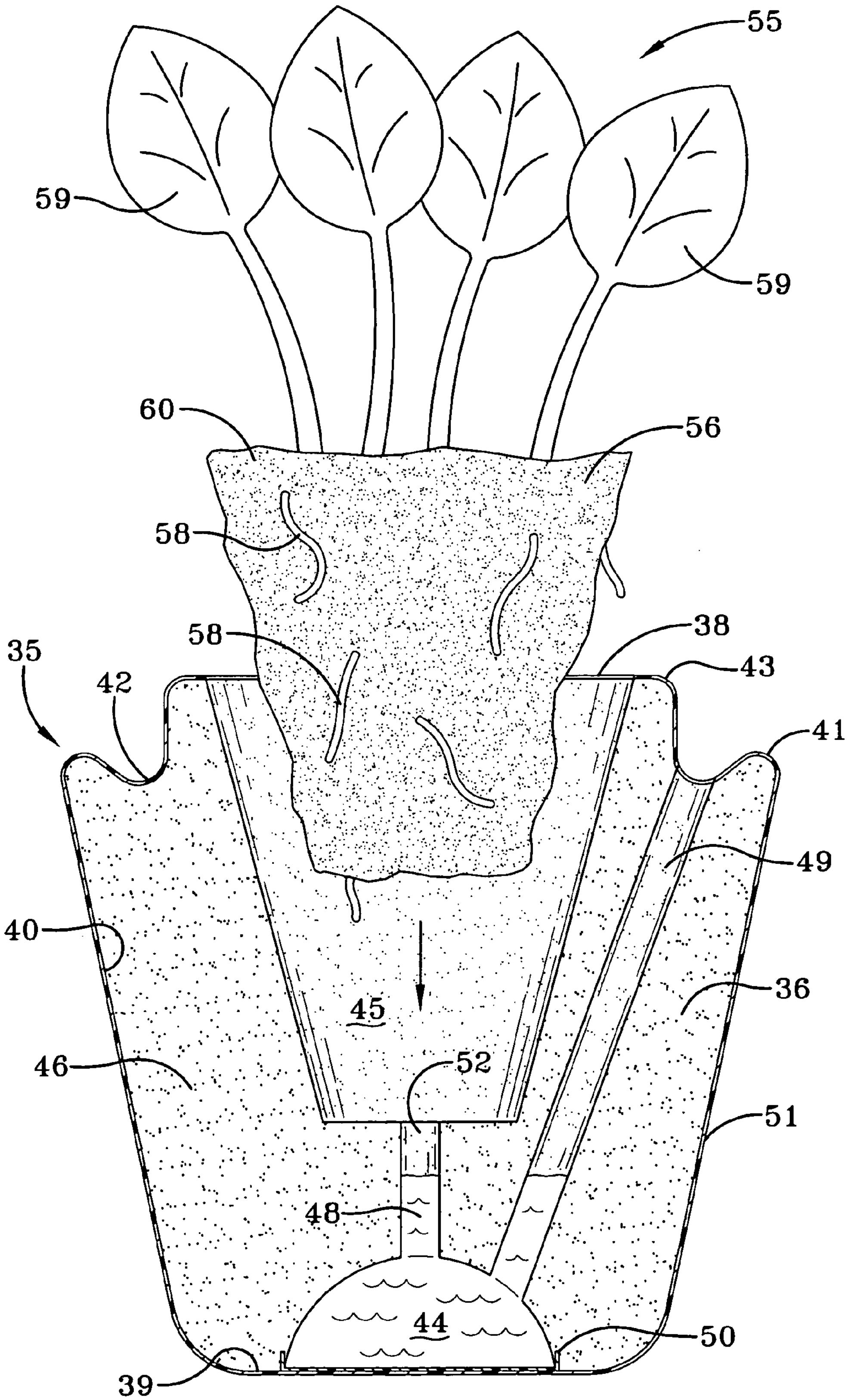
FIG. 6 is a cross-sectional view of the vessel depicted in FIG. 5, depicting the foam center with reservoirs for air and water and a cavity for the placement of a plant soil or soilless mix root ball.

In the next FIGS. 5 and 6, another embodiment of vessel is depicted, indicated generally by the numeral 35. Referring specifically to FIG. 6, the vessel 35 comprises a foam core 36, providing an upper surface 38, a base 39 and continuous sidewall 40. Toward the top of the vessel, an external flange 41 is provided having a peripheral trough 42, the purpose of which will be explained subsequently. The flange 41 extends outwardly from the vessel, which provides a frusto-conical shape, and is encompassed by an internal neck 43, which blends into the top of vessel 35.

The vessel 35 provides at least one reservoir 44 at its base, which is dome-shaped but need not be. Its dimensions are not overly critical to operation of the vessel; however, it generally has a height of about 4 inches (10 cm) to about 12 inches (30.5 cm) and a width that is also about 4 inches (10 cm) to about 12 inches (30.5 cm). Again, both parameters are a function of the vessel size and geometry, as well as the habits of the plant, in terms of water uptake. Additionally, the foam core can also be influential, as noted hereinabove.

Unlike the vessel 10, the vessel 35 has at least one relatively large conical cavity 45 cut into it from the top and extending into the body 46, the size of which can be varied to accommodate the plant root ball. A passageway 48 is also bored through the foam core 36, joining the cavity 45 and the reservoir 44. Finally, a plurality of bores 49 are cut through the foam core 36, each extending from the peripheral trough 42 into the reservoir 44. As shown in FIG. 5, there can be three such bores, two of which are shown, the bores being spaced at 120° intervals. Of course, such symmetry is not necessary nor, do the number of bores required need to be three.

As for the vessel 10, a plastic or metal cap 50 is inserted into the foam core 36 at the base of the reservoir 44 to seal it and the core is then coated with a water proof material to form an external surface or shell 51.

In preparation for use, the reservoir 44 is first at least partially filled with water, which may also include the passageway, as at 52. Next, a plant 55, initially cultivated outside of the vessel 35, is planted in the cavity 45. Plant 55 is transplanted with a plant root ball 56 and thus, the cavity 45 is suitably sized to receive the ball 56. Roots 58 have grown throughout the ball 56 and will eventually grow into and proliferate in the passageway 46 and reservoir 44, although this stage of growth is not depicted in the drawings.

The design of vessel 35 is for plants 55 that should not be watered directly, that is, by pouring water onto the vegetation 59 or directly onto the soil surface 60. Plants such as African violets, for instance, are harmed by such application and must instead be watered indirectly. Accordingly, the vessel 35 is designed for the addition of water to the peripheral trough 42, where it is first taken down into the reservoir 44 but also absorbs directly into the foam core 36. The foam translocates the water, keeping the plant root ball 56 uniformly wet which facilitates the growth of the roots within the plant root ball, the foam, passageway 48 and reservoir 44.

Figure 7:
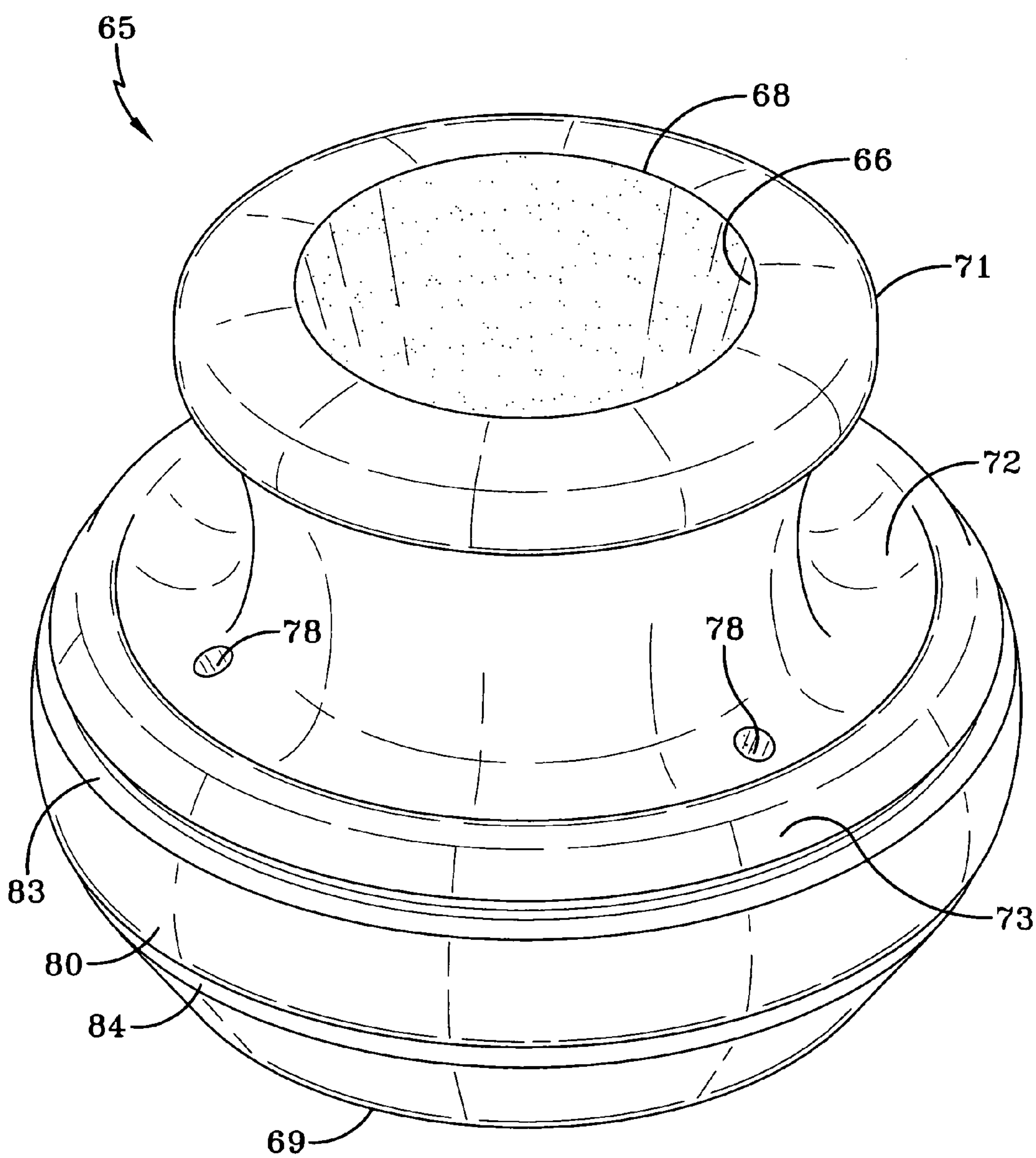
FIG. 7 is a perspective view of another vessel for growing plants aeroponically; and, FIG. 8 is a cross-sectional view of the vessel depicted in FIG. 7, depicting the foam center with reservoirs for air and water and a cavity for the placement of a plant soil ball.
Figure 8:
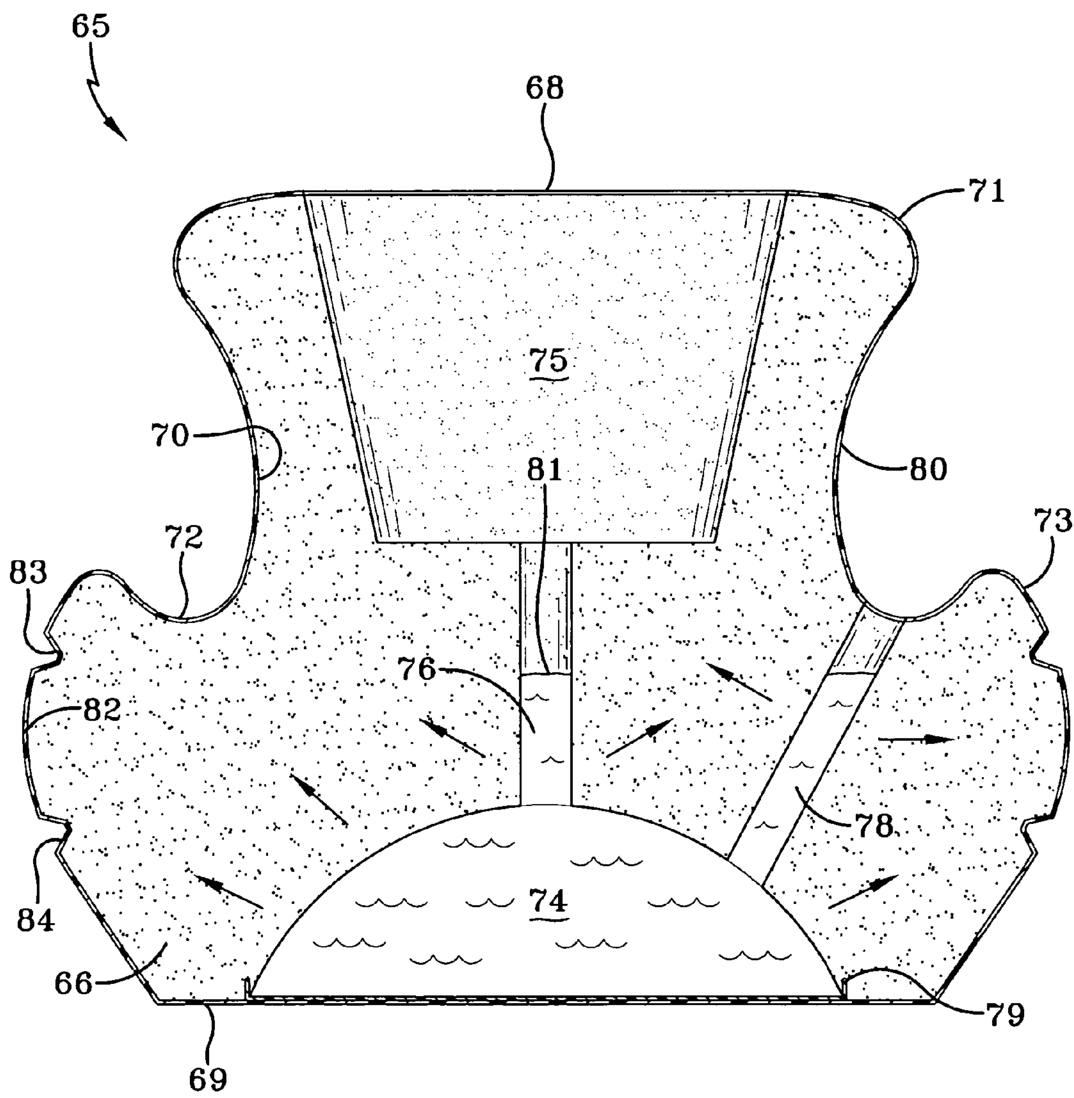

In the next FIGS. 7 and 8, yet another embodiment of vessel is depicted, indicated generally by the numeral 65. Referring specifically to FIG. 8, the vessel 65 comprises a foam core 66, providing an upper surface 68, a base 69 and continuous sidewall 70. Toward the top of the vessel, a shoulder 71 is provided from which the sidewall 70 curves inwardly, terminating in a peripheral trough 72. The sidewall then curves upwardly and out to form an external flange 73 and then curves downwardly and inward to join the base 69.

The vessel 65 provides at least one reservoir 74 at its base, which is dome-shaped but need not be. Its dimensions are not overly critical to operation of the vessel; however, it generally has a height of about one-quarter to about one-half that of the vessel height and a width that is about one-half to about three-quarter that of the vessel base 69. Again, both parameters are a function of the vessel size and geometry, as well as the habits of the plant, in terms of water uptake. Additionally, the foam core can also be influential, as noted hereinabove.

Similar to the vessel 35, the vessel 65 has at least one relatively large conical cavity 75 cut into it from the top, the size of which can be varied to accommodate a soil ball. A passageway 76 is also bored through the foam core 66, joining the cavity 75 and the reservoir 74. Finally, a plurality of bores 78 are cut through the foam core 66, each extending from the peripheral trough 72 into the reservoir 74. As shown in FIG. 7, there can be three such bores, two of which are shown, the bores being spaced at 120° intervals. Of course, such symmetry is not necessary nor, do the number of bores required need to be three.

As for the vessel 35, a plastic or metal cap 79 is inserted into the foam core 66 at the base of the reservoir 74 to seal it and the core is then coated with a water proof material to form an external surface or shell 80.

In preparation for use, the reservoir 74 is first at least partially filled with water, which may also include the passageway, as at 81. Next, a plant (not shown) which is initially cultivated outside of the vessel 65, is planted in the cavity 75. The plant is transplanted with a soil ball and thus, the cavity 75 is suitably sized to receive the ball. Roots from the soil ball and plant will have grown throughout the ball and will eventually grow into and proliferate in the passageway 76 and reservoir 74, although this stage of growth is not depicted in the drawings.

The design of vessel 65 also allows for watering of the plant indirectly by the addition of water to the peripheral trough 72, where it is first taken down into the reservoir 74 but also absorbs directly into the foam core 66. Both areas translocate water from the foam to the root ball to maintain uniform moisture thus, facilitating the growth of the vegetation and roots.

The vessel 65 has a broad lower section or body 82 which can optionally be provided with continuous grooves 83, 84, which extend circumferentially for a vessel of round geometry. These grooves are somewhat decorative as well as functional to the extent that they reinforce the vessel 65, particularly its shell 80.

As set forth hereinabove, the method of the present invention allows for the transplanting of a variety of plants into the various vessels, which are different first, in that they employ a polymer foam rather than soil to receive the plant and second in that the plant roots grow aeroponically. Heretofore, florists and growers have employed foam filled vessels for holding and displaying cut flowers but not growing for growing plants.

Another advantage of the present invention is that the polymer foam is more conducive to watering of the plant. In soil it is often easy to overwater by supersaturating the soil and root ball or to underwater, in which instance the soil drys out, followed by the roots. The polymer foam, with its reservoir and passageways, provides receptacles to receive and hold excess water, which is then moved by capillary action into the foam. Similarly, when the foam begins to dry out, extra water can be drawn from the reservoir. Of course, while the vessels of the present invention require less attention, periodic watering and proper control over light and temperature are still needed.

Although not shown in the drawings, the florist, or other user, can also employ the vessel to hold some cut flowers, interspersed with the plant. The foam core will provide adequate water for a short floral life and when the flowers do wilt, they can be removed, leaving the plant to continue growing and provide an extended period of beauty and enjoyment.

Thus, it should be evident that the vessels and method of the present invention are highly effective in allowing plants to be grown in indoor environments. While the vessels depicted in the drawings have specific shapes and geometries, it is to be understood that they are not limited to round or spherical shapes, as various polygonal cross-sections will function similarly to provide the aeroponic environment for the plant. Likewise, while each vessel depicts a single cavity or reservoir for initially holding water, vessels having more than one such cavity are also envisioned. Similarly, those vessels having a second cavity for receipt of a transplanted plant can also provide more than one such cavity.

Based upon the foregoing disclosure, it should now be apparent that the use of the vessels described herein will carry out the objects set forth hereinabove. It is, therefore, to be understood that any variations evident fall within the scope of the claimed invention and thus, the selection of specific component elements, such as shape, type of foam core, internal geometries and external coatings can be determined without departing from the spirit of the invention herein disclosed and described. In particular, vessels according to the present invention are not necessarily limited to those having a hydrophilic foam core. Thus, the scope of the invention shall include all modifications and variations that may fall within the scope of the attached claims.

What is claimed is:

1. A method for the propagation of and aeroponic growing of plants comprising:

providing a vessel having a foam core, defining an upper surface, a base and a sidewall, said foam core providing a first growing medium;

a waterproof outer coating at least partially covering said foam core;

at least a first cavity in said foam core, proximal to said base;

a cap member, larger than the opening of said first cavity, positioned between said base and said outer coating, providing a closure to said first cavity;

at least a second cavity in said upper surface;

a first passageway extending through said foam core communicating between said first and second cavities;

transplanting a living plant having roots in a second growing medium into said second cavity, said first and second media sharing a common interface along the surfaces of said second cavity; and applying water to saturate said foam core and concurrently providing water and moist air in said first passageway and into said first cavity, whereby roots of said plant extend into and grow within said first passageway and throughout said second cavity and then grow into said first cavity to a greater extent than their growth into said foam core.

2. A method as set forth in claim 1, the including the step of adding water to said foam core.

3. A method as set forth in claim 1, wherein said vessel further comprises an external flange proximal to said upper surface;

a peripheral trough between said upper surface and said external flange; and at least one bore passing through said foam core, providing a communication between said trough and said first cavity whereby the addition of water to said trough will fill said first cavity at least partially and wet said foam core.

4. A method as set forth in claim 3, wherein said step of applying water includes the step of directing water into said second cavity.

5. A method as set forth in claim 3, including the step of adding water into said trough.

6. A vessel for the propagation of and aeroponic growing of living plants comprising in combination:

a foam core, defining an upper surface, a base and a sidewall, said foam core providing a first growing medium;

a living plant with roots provided in a second growing medium;

a waterproof outer coating at least partially covering said foam core;

at least one first cavity in said foam core, proximal to said base;

a cap member, larger than the opening of said first cavity, positioned between said base and said outer coating, providing a closure to said first cavity; and at least one second cavity in said upper surface for receipt of said second growing medium, said first and second media sharing a common interface along the surface of said second cavity; a first passageway extending through the foam core through said foam core communicating between said first and second cavities;

wherein said foam core, said first and second cavities, and said passageway provide a supply of water and moist air which together facilitate the growth of said roots throughout said cavities and said passageway to a greater extent than their growth into said foam, when water is applied to said foam core.

7. A vessel, as set forth in claim 6, wherein said first cavity has a height of from about one-quarter to one-half the length of said foam core and a width or from about one-fourth to about three-quarters the width of said foam core.

8. A vessel, as set forth in claim 6, wherein said first cavity has a height of from about 4 inches (10 cm) to about 12 inches (30.5 cm) and a width of from about 4 inches (10 cm) to about 12 inches (30.5 cm).

9. A vessel, as set forth in claim 6, wherein said second cavity is dimensioned to fit the root ball of said living plant transplanted therein.

10. A vessel, as set forth in claim 6, wherein said foam core is selected from the group consisting of hydrophilic polymer foams.

11. A vessel, as set forth in claim 6, wherein said coating is selected from the group consisting of epoxies, polyurethanes and phenolic resins.

12. A vessel, as set forth in claim 6, further comprising:

an external flange proximal to said upper surface;

a peripheral trough between said upper surface and said external flange;

at least one bore passing through said foam core, providing a communication between said trough and said first cavity whereby the addition of water to said trough will fill said first cavity at least partially and wet said foam core.

* * * * *